Patented Apr. 18, 1933

1,904,461

UNITED STATES PATENT OFFICE

RAYMOND W. HESS, OF BUFFALO, NEW YORK, ASSIGNOR TO THE BARRETT COMPANY, OF NEW YORK, N. Y., A CORPORATION OF NEW JERSEY

CONCENTRATION OF MINERALS BY FLOTATION

No Drawing.   Application filed February 4, 1928.   Serial No. 252,045.

This invention relates to the separation of minerals and the concentration of ores by flotation processes, and is particularly directed to such separation and concentration carried out with the utilization of certain organic sulfur compounds or bodies as flotation agents.

According to the present invention, improved results can be obtained in the separation of minerals and the concentration of ores by carrying out the flotation operation with the addition to the mineral ore or pulp of a composition comprising an aralkyl mercaptan and a diaralkyl monosulfide, e. g., benzyl mercaptan and dibenzyl monosulfide, and more especially the resultant organic product or composition of matter produced by reacting an aralkyl halide, for instance, benzyl chloride, with a water soluble metal hydrosulfide, for example, sodium hydrosulfide.

The flotation agent or adjuvant particularly contemplated in the present invention can be prepared by reacting benzyl chloride with an alkali metal hydrosulfide, e. g., sodium hydrosulfide, in an aqueous medium. The reaction is preferably carried out at temperatures below 100° C., preferably about 75° to 80° C., and in general, an excess of preferably about 10 to 35 percent of sodium hydrosulfide over that theoretically required for reaction with the benzyl chloride is employed; but other proportions may be used. The initial strength of the sodium hydrosulfide solution employed is preferably about 5 to 15 percent, or better, about 7 to 10 percent. At the completion of the reaction, the reaction-mass is diluted with water, and then acidified with any suitable acid such as hydrochloric or sulfuric acid. Two liquid layers are obtained, an aqueous layer and an organic composition or product as an oily layer, the oily layer comprising the flotation agent particularly contemplated in the present invention is removed in any suitable manner. It may be treated with dry soda ash until substantially free from acid, and then separated from any residual soda ash. The crude product thus obtained is comprised, in general, chiefly of benzyl mercaptan (about 75 to 90 percent) associated with other organic sulfur bodies such as, in general, dibenzyl monosulfide (about 5 to 8 to 20 percent), and sometimes also small amounts of dibenzyl polysulfide and other organic substances such as, for example, benzyl chloride, stilbene, etc. For example, if the benzyl chloride employed is impure and contains, for instance, benzal chloride, dibenzyl disulfide may be present. Ordinarily, about 80 to 90 percent of the crude product boils within a range of about 175° to 220° C. Other conditions and proportions may yield a product containing other amounts of benzyl mercaptan and correspondingly different amounts of dibenzyl monosulfide. Analogous products may be obtained in a similar manner by the action of other aralkyl halides, such as, for example, methylbenzylchloride, etc., on sodium hydrosulfide.

In carrying out the flotation process, the flotation agent comprising the aralkyl mercaptan and diaralkyl monosulfide, for example, a mixture comprising benzyl mercaptan and dibenzyl monosulfide, or, for example, the product which contains an aralkyl mercaptan and diaralkyl monosulfide and which can be obtained by the interaction of an aralkyl halide with alkali metal hydrosulfide or other aqueous soluble hydrosulfides, may be incorporated with the ore or mineral pulp in any suitable manner and at any suitable time which will insure a satisfactory flotation operation. For example, it may be introduced in the free state or it may be dissolved, suspended or dispersed in any suitable solvent or dispersing agent such as, for example, water, caustic alkali, or in one or more flotation oils or oil mixtures, or in any suitable organic solvent or medium such as, for example, a hydrocarbon, an organic amine, a phenol, or another mercaptan, and the resulting solution, suspension or dispersion then may be incorporated with the ore or ore pulp. While the present flotation agents show marked action as flotation or collecting agents in ore concentration, they are ordinarily used to advantage in conjunction with any suitable frothing agent or agents, e. g., pine oil, crude turpentine, tar acids, etc. They may be often used with advantage in conjunction with other flotation agents.

The process of the present invention may be carried out in any suitable apparatus, for example, those of the pneumatic type such as the Callow cell, or those where the air is incorporated with the mixture by mechanical agitation such as the Janney apparatus, or the like.

In general, it is of advantage to submit the pulp to the action of an amount of alkali to give it a distinctly alkaline reaction before subjecting it to the flotation operation with the aid of a flotation agent of the present invention. The alkali may be caustic such as caustic soda, or an alkaline salt such as soda ash, or it may be calcium oxide or hydrate.

The amount of flotation agent required to be used in the flotation operation will vary, it depending partly on the character and composition of the ore, and partly on other factors. Ordinarily, about one-sixth to one-fourth pound of the flotation agent per ton of ore will be sufficient, while in other cases larger or smaller amounts than this may be required.

The invention will be further illustrated by the following specific examples, but it will be understood that the invention is not limited thereto. The parts are by weight.

*Example 1.*—500 parts of a copper sulfide ore (a sample of ore of the Old Dominion Copper Mining Co., Globe, Arizona) assaying 3.69 percent of copper was ground to a 40-mesh powder in a ball mill with 215 parts water and 0.7 parts of hydrated lime (equivalent to about 2.8 pounds per ton of ore). 0.0425 parts of a composition prepared by the interaction of benzyl chloride and sodium hydrosulfide, said composition containing about 80 to 90 percent benzyl mercaptan and 10 to 15 percent dibenzyl monosulfide, was then incorporated with the ground pulp, and the mixture diluted with water to give about 15 to 16 percent solids and subjected to flotation in a Janney apparatus. The mixture was agitated for 20 minutes during which time about 0.04 parts of pine oil were introduced. 163.2 parts of a concentrate assaying 10.87 percent of copper was obtained which is a recovery in the concentrate of 95.4 percent of the copper. The tailings assayed 0.25 percent copper.

*Example 2.*—500 parts of table tailings of an Anaconda Copper Co. copper sulfide ore assaying 1.528 percent copper was treated as in Example 1 except in place of the specific flotation agent mentioned therein there was employed 0.0625 parts of a flotation agent containing about 85 percent of benzyl mercaptan, 10 to 12 percent of dibenzyl monosulfide, and 1 to 2 percent of benzyl disulfide. 37.1 parts of concentrate assaying 18.8 percent was obtained which is a recovery of 92.5 percent of copper.

It will thus be noted that the present invention contemplates the utilization as a flotation agent of a composition comprising an aralkyl mercaptan and a diaralkyl monosulfide, and particularly the product obtained by the action of benzyl chloride on sodium hydrosulfide in aqueous media; that the flotation agent may be incorporated with the ore or mineral pulp in any well-known or suitable manner; that it may be used in the free state or as a salt or in solution, suspension or dispersion in any suitable solvent or media; and that it may be used in conjunction with a frothing agent or with other flotation agents, or both.

It will be understood that the present invention is applicable to the treatment of various kinds of mineral mixtures, both natural and artificial, which are amenable to concentration by flotation processes.

I claim:

1. In effecting the concentration of minerals, the process which comprises incorporating with a mineral pulp a composition comprising an aralkyl mercaptan and a diaralkyl monosulfide, and subjecting the resulting mixture to a froth-flotation operation.

2. In effecting the concentration of minerals, the process which comprises incorporating with a mineral pulp a composition comprising an aralkyl mercaptan, a diaralkyl monosulfide, and a diaralkyl polysulfide, and subjecting the resulting mixture to a froth-flotation operation.

3. In effecting the concentration of minerals, the process which comprises incorporating with a mineral pulp a crude benzyl mercaptan comprising the mixed oily organic product obtainable by reacting benzyl chloride with aqueous sodium hydrosulfide, and subjecting the resulting mixture to a froth-flotation operation.

4. In effecting the concentration of minerals, the process which comprises incorporating with a mineral pulp a composition comprising benzyl mercaptan and dibenzyl monosulfide, and subjecting the resulting mixture to a froth-flotation operation.

5. In effecting the concentration of minerals, the process which comprises incorporating with a mineral pulp a composition comprising benzyl mercaptan, dibenzyl monosulfide, and dibenzyl disulfide, and subjecting the resulting mixture to a froth-flotation operation.

6. In effecting the concentration of minerals, the process which comprises incorporating with a mineral pulp a composition comprising about 75 to 90 percent benzyl mercaptan and 5 to 20 percent of an organic mixture containing dibenzyl monosulfide, and subjecting the resulting mixture to a flotation operation.

7. In effecting the concentration of minerals, the process which comprises incorporating with a mineral pulp a composition comprising about 85 percent benzyl mercaptan and 10 to 12 percent dibenzyl monosulfide, and subjecting the resulting mixture to a froth-flotation operation.

8. In effecting the concentration of minerals, the process which comprises incorporating with a mineral pulp a composition comprising benzyl mercaptan associated with dibenzyl monosulfide, in which benzyl mercaptan predominates, and subjecting the resulting mixture to a froth-flotation operation.

9. In effecting the concentration of a copper sulfide ore, the process which comprises subjecting an alkaline pulp of the ore to a froth flotation operation in the presence of an aralkyl mercaptan and a diaralkyl monosulfide.

10. In effecting the concentration of a copper sulfide ore, the process which comprises subjecting an alkaline pulp of the ore to a froth-flotation operation in the presence of a mixture of benzyl mercaptan and dibenzyl monosulfide in which mixture the benzyl mercaptan predominates.

11. In effecting the concentration of minerals, the process which comprises subjecting an ore pulp to a froth-flotation operation in the presence of an organic composition comprising a mixture of the aralkyl sulfur compounds including an aralkyl mercaptan resulting from the reaction of an aralkyl halide with a water soluble metal hydrosulfide.

In testimony whereof I affix my signature.

RAYMOND W. HESS.